Nov. 7, 1933.                    C. ANDERSON                    1,934,519
                                   SHUTTER
                             Filed Dec. 27, 1930
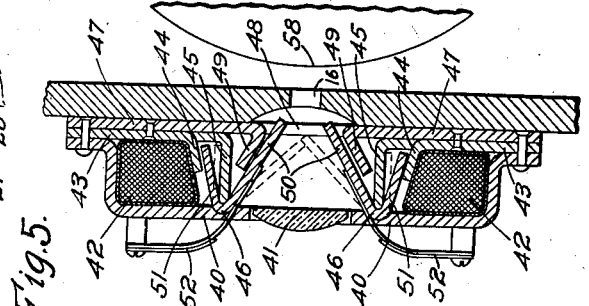
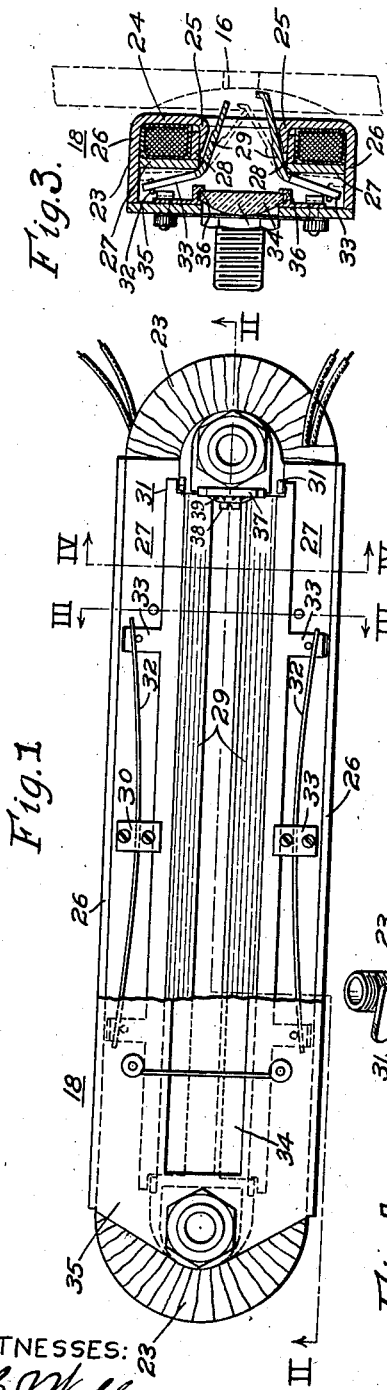
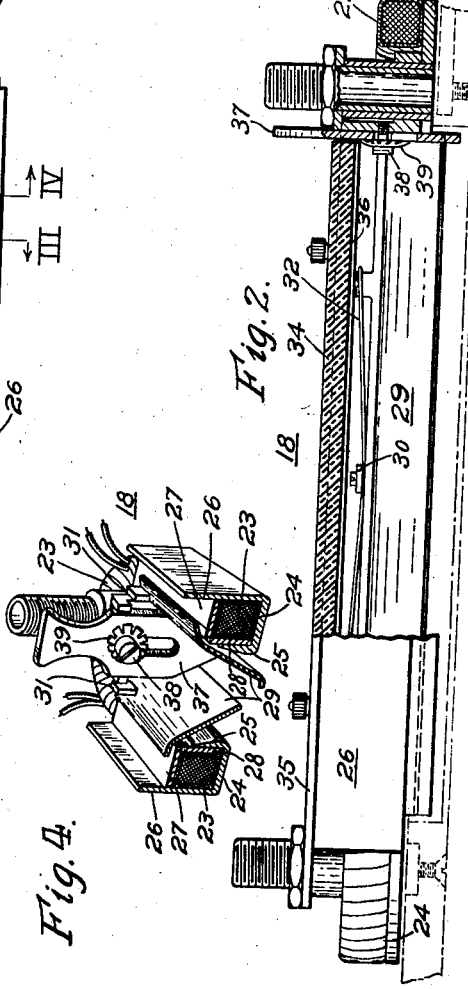
WITNESSES:
C. J. Weller
F. M. Harris
INVENTOR
Clare Anderson.
BY
Wesley G. Carr
ATTORNEY Patented Nov. 7, 1933

1,934,519

UNITED STATES PATENT OFFICE 1,934,519

SHUTTER

Clare Anderson, Belleville, N. J., assignor to Westinghouse Electric & Manufacturing Company, a corporation of Pennsylvania Application December 27, 1930
Serial No. 505,059

7 Claims. (Cl. 88—19.3)

My invention relates to oscillographs and more particularly to an electromagnetic shutter suitable for use in oscillographs.

An object of my invention is to provide an improved shutter for an oscillograph.

A further object of my invention is to provide shutters which have improved speed and operating characteristics.

In practicing my invention, I employ a magnetic shutter so located between the galvanometer and the film that the oscillograph lamp may be lighted without exposing the film. The shutter is specially constructed for fast operation and is so located, with respect to a cylindrical lens, as to obtain a maximum speed and efficiency. The film holder is driven through a magnetic clutch, and the magnetic shutter, the clutch and the lamp are energized in response to a transmission-line disturbance.

Other objects, features and advantages of my invention will be apparent from the following description, taken in connection with the accompanying drawing in which:

Fig. 1 is a view of the side of the shutter, a portion of the shutter cover plate being broken away, Fig. 2 is a view taken on the line II—II of Fig. 1, Fig. 3 is a sectional view taken on line III—III of Fig. 1, Fig. 4 is a perspective view taken on the line IV—IV of Fig. 1, and Fig. 5 is a view, in cross-section, of a modified form of shutter.

A magnetic shutter 18, which constitutes my invention, may be positioned in an oscillograph between the galvanometers and a slit 16 adjacent to the photographic film. A cylindrical lens 34 is mounted opposite the slit 16 and supported by means of the shutter structure.

Referring to Figs. 1 to 4, the shutter 18 comprises a magnetic casing surrounding a magnet coil 23. The casing comprises a piece of magnetic sheet material 24 (Fig. 3) which has a long rectangular opening stamped therein and extending longitudinally thereof. At the edges of this opening, the sheet material is turned in to form the inwardly projecting portions 25. The upper and lower edges of the sheet material are bent over at right angles to form the members 26. The casing for the magnet coil 23 is completed by means of a rectangular strip 27 of magnetic material and a rectangular strip 28 of non-magnetic material.

The shutter vanes 29, of magnetic material, are rectangular in form and slightly longer than the slit 16 in the oscillograph casing. The vanes are respectively pivoted on the lateral edge of strips 27 and are maintained in position by means of clips 30 and pieces 31 which project from the strips 27. Each shutter vane 29 is normally maintained closed, as shown in dotted lines in Fig. 3, by means of a spring 32 secured at its mid-point to the clip 30 on the strip 27 and having the ends thereof bearing against arms 33 projecting from the vanes 29.

The cylindrical lens 34 is supported on the back of the shutter structure by means of a piece of sheet material 35 having a rectangular opening therein to accommodate the lens. The sheet 35 may be of either magnetic or non-magnetic material. The lens 34 is held in position by means of clips 36 secured to the sheet 35.

Means is provided for keeping the shutter open, when desired even though no current is flowing through the magnet coil 23. This means comprises a member 37 of wedge-shape (Fig. 4) which is mounted on one end of the shutter structure by means of a screw 38 and friction washer 39. The shutter is opened by forcing down the wedge 37 to move it to the position shown in Fig. 4.

The shutter illustrated in Fig. 5 is the same in principle as the shutter described above. It comprises a plate 40 of magnetic material which has a rectangular opening in the middle thereof for receiving a cylindrical lens 41. The upper and lower edges of the plate 40 are bent over to form the top and bottom of the casing for the coil 42. The front of the coil casing is formed by rectangular members 43 of magnetic material which are riveted to the plate 40. The inner edges of the members 43 are bent inwardly to constitute supporting strips 44 for the inside edges of the coil 42. Narrow lugs 45 extend from the members 43 to support the shutter vanes 46.

Each shutter vane 46 comprises a rectangular piece of magnetic material bent into the form of a trough. Each vane is pivotally mounted between the plate 40 and the supporting lugs 45.

A piece of magnetic sheet material 47 is riveted to the front of the shutter casing to provide an additional magnetic path through the shutter vanes. The plate 47 has a rectangular opening 48 punched therein; the plate 47 at the upper and lower edges of the opening being turned inwardly to form the projections 49. The projections 49 are so positioned with respect to the shutter vanes 46 that the vanes rest against the projections 49 when the shutter is open.

The sides 50 of the trough-shape vanes 46 serve both as shutter vanes and as armatures of the magnet for operating the shutter. The other sides 51 of the trough-shape members 46 act solely as armatures for increasing the speed of the shutter.

It will be noted that, in this form of shutter, there are two magnetic paths. In the upper portion of the shutter, the first path may be traced through the plate 40, the upper armature 51 and the members 44 and 43. The other path may be traced through the plate 40, the lower armature 50, projection 49 and the plate 47. Since the lugs 45 have a small cross section, as compared with the cross section of the turned-in edges 44 and 49, they do not short-circuit the two above-mentioned magnetic paths.

The shutter is normally held in a closed position by means of springs 52 which are mounted on the back side of the casing.

By employing two shutter vanes, to make the shutter double acting, and by positioning the shutter vanes between the cylindrical lens and its focal point, the shutter may be completely and effectively opened by moving the vanes through a small distance. By decreasing the distance through which the vane must move by one-half, the speed of the shutter is more than doubled. It will be noted that the focus of the lens 41 is at the surface of the film 58.

Since various modifications may be made in my invention without departing from the spirit and scope thereof, I desire that only such limitations shall be placed thereon as are imposed by the prior art and are set forth in the appended claims.

I claim as my invention:

1. A magnetic shutter comprising a magnet coil and a movable member constituting a shutter vane, said movable member being composed of magnetic material and cooperating with said coil to constitute an armature therefor.

2. A magnetic shutter comprising a shutter vane for closing said shutter and a magnet coil, said vane being of magnetic material and constituting an armature for said magnet coil.

3. A magnetic shutter comprising a movable element of magnetic material constituting the closure member thereof, and means, including a magnet coil, for controlling said movable element, said element being in the field of said coil.

4. A shutter comprising two armatures of magnetic material, said armatures being rectangular in form and positioned, when the shutter is closed, with an edge of one armature approximately in contact with an edge of the other armature to form a structure having a cross-section of V-shape, said armatures being pivoted at the edges corresponding to the top of said V, and a magnet coil for moving said armatures apart at the apex of said V.

5. A shutter comprising two armatures of magnetic material, said armatures being rectangular in form and positioned, when the shutter is closed, with an edge of one armature approximately in contact with an edge of the other armature to form a structure having a cross-section of V-shape, said armatures being pivoted near the edges corresponding to the top of said V, and a magnet coil for moving said armatures apart at the apex of said V, said coil being so positioned with respect to said armatures, that one of the poles of said magnet coil faces in the same direction as the apex of said V.

6. A shutter comprising two armatures of magnetic material, said armatures being rectangular in form and positioned, when the shutter is closed, with an edge of one armature approximately in contact with an edge of the other armature to form a structure having a cross-section of V-shape, said armatures being pivoted near the edges corresponding to the top of said V, and a magnet coil for moving said armatures apart at the apex of said V, said magnet being substantially rectangular in form and having the long sides thereof partially encased in magnetic material to provide a magnetic path of low reluctance, each of said armatures being so positioned as to reduce the reluctance of one of said magnetic paths.

7. A shutter comprising two armatures of magnetic material, said armatures being rectangular in form and positioned, when the shutter is closed, with an edge of one armature approximately in contact with an edge of the other armature to form a structure having a cross-section of V-shape, said armatures being pivoted near the edges corresponding to the top of said V, and a magnet coil for moving said armatures apart at the apex of said V, said magnet being substantially rectangular in form and having each of the long sides thereof encased in magnetic material to provide a plurality of magnetic paths of low reluctance, each of said armatures having a member corresponding to each of said paths, said members being positioned to reduce the reluctance of their corresponding magnetic paths.

CLARE ANDERSON.